United States Patent
Englert et al.

(10) Patent No.: US 7,915,887 B2
(45) Date of Patent: Mar. 29, 2011

(54) DEVICE FOR GENERATING A MAGNETIC FIELD IN A GOAL AREA FOR TAKING A GOAL DECISION

(75) Inventors: Walter Englert, Burgrieden (DE); Tilman Bucher, Munich (DE); Oliver Braun, Karlsbad (DE); Christian Holzer, Munich (DE)

(73) Assignee: Cairos Technologies AG, Karlsbad (DE)

( * ) Notice: Subject to any disclaimer, the term of this patent is extended or adjusted under 35 U.S.C. 154(b) by 637 days.

(21) Appl. No.: 12/036,010

(22) Filed: Feb. 22, 2008

(65) Prior Publication Data
US 2009/0108835 A1 Apr. 30, 2009

Related U.S. Application Data

(60) Provisional application No. 60/894,554, filed on Mar. 13, 2007.

(30) Foreign Application Priority Data

Feb. 26, 2007 (DE) .......................... 10 2007 009 232

(51) Int. Cl.
*G01B 7/14* (2006.01)

(52) U.S. Cl. ................................ 324/207.16; 324/207.26
(58) Field of Classification Search .................... None
See application file for complete search history.

(56) References Cited

U.S. PATENT DOCUMENTS

| 4,375,289 A * | 3/1983 | Schmall et al. ............ 273/371 |
| 2006/0247076 A1* | 11/2006 | Petersen ..................... 473/476 |
| 2008/0085790 A1* | 4/2008 | Englert ...................... 473/470 |
| 2008/0090683 A1* | 4/2008 | Englert et al. ............. 473/570 |

FOREIGN PATENT DOCUMENTS

| DE | 2732543 A1 | 7/1977 |
| WO | WO 9532774 A1 * | 12/1995 |
| WO | WO 00/47291 A1 | 8/2000 |

* cited by examiner

*Primary Examiner* — Jay M Patidar
(74) *Attorney, Agent, or Firm* — Michael A. Glenn; Glenn Patent Group

(57) ABSTRACT

A device for generating a magnetic field in a goal area with at least two coils arranged in parallel to a goal area defined and bounded by a goal, wherein a first coil is attached in an area behind the goal and a second coil is attached closer to the goal than the first coil or identical to the goal, wherein the first coil and the second coil respectively have a coil impedance, wherein the coil impedance of the second coil is set so that a magnetic field of the second coil generated due to a magnetic field of the first coil reduces the magnetic field of the first coil at a location within the second coil by at least 20%.

25 Claims, 12 Drawing Sheets

_US 7,915,887 B2_

DEVICE FOR GENERATING A MAGNETIC FIELD IN A GOAL AREA FOR TAKING A GOAL DECISION

CROSS-REFERENCE TO RELATED APPLICATIONS

This application claims priority from U.S. Provisional Patent Application No. 60/894,554, which was filed on Mar. 13, 2007, and is incorporated herein in its entirety by reference.

TECHNICAL FIELD

The present invention relates to a concept for generating a magnetic field in a goal area for determining the position of a movable object, as it can, for example, be used in soccer for taking a decision about whether a goal has been scored.

BACKGROUND

A number of tasks, such as ball localization in a football or soccer match, presuppose knowledge of the position and/or orientation of objects. In soccer matches, one of the most controversial topics is whether or not in critical situations the ball has crossed the goal line. To this end, it is necessary that the position of the ball can be measured with an accuracy of approx. +/−1.5 cm within a limited goal area around the goal line. Also, it is necessary for any influences exerted by persons who are moving close to the ball and/or are covering the ball to be irrelevant.

There are a number of localization methods based, for example, on optical 2D or 3D sensors having an evaluation system, or an exploitation of the known radar principle or of a principle of radio localization.

A principle of radio localization is the localization of objects by means of electromagnetic wave propagation. In this context, a receiver is integrated into an object to be localized, or is attached to an object to be localized, respectively, the receiver transmitting data to a central transceiver upon request. A position of the object may thereafter be calculated from signal traveling times and/or from differences between at least two signals received at different antennas.

Radio localization of objects may be performed, for example, by means of the so-called RFID technology (RFID=radio frequency identification). For spatial resolution methods, wherein a relatively precise position of an RFID transponder is to be determined in space, battery-powered, i.e. active RFID transponders, are most often used. A disadvantage of radio localization exists in a shadowing and/or a reflection of electromagnetic waves by certain obstacles, for example. As a result, systems based on a radio localization will not achieve the accuracy necessitated for taking goal decisions in football, or soccer, for example.

As has already been described, current localization methods are based, for example, on optical 2D or 3D sensors comprising an evaluation system, or they are based on the use of battery-powered, i.e. active, RFID transponders. Such localization methods entail high investment and maintenance costs, sensitivity towards environmental conditions and a high effort necessitated for adapting the evaluation algorithms. Systems exploiting radio localization are not suitable for local area localization, i.e. for determining the positions of objects within a small area, since with a small geometric expansion differences of different signal traveling times can hardly be measured. Thus, the requirements placed upon systems for localizing objects are not met, or are only met to an insufficient degree, by these methods with regard to economic efficiency, robustness, clock time and object independence for an exact position determination, for example within a range of a few centimeters.

SUMMARY

According to an embodiment, the present invention provides a device for generating a magnetic field in a goal area, comprising at least two coils arranged in parallel to a goal area defined and bounded by a goal, wherein a first coil is attached in an area behind the goal and a second coil is attached closer to the goal than the first coil or attached identically to the goal, wherein the first coil and the second coil respectively comprise a coil impedance, wherein the coil impedance of the second coil is set so that a magnetic field of the second coil generated due to a magnetic field of the first coil reduces the magnetic field of the first coil at a location within the second coil by at least 20%.

According to another embodiment, the present invention provides a system for determining information about a position of a movable object in a goal area, in which at least two coils are attached in parallel to a goal area bounded and defined by a goal, wherein a first coil is attached in an area behind the goal and a second coil is attached closer to the goal than the first coil or identical to the goal, wherein the first coil and the second coil respectively comprise a coil impedance, wherein the coil impedance of the second coil is set so that a field of the second coil generated due to a magnetic field of the first coil reduces the magnetic field of the first coil at a location within the second coil by at least 20%, which may have a device for providing information about a magnetic field which the movable object experiences at the position in the goal area; and a device for evaluating information about the magnetic field to obtain information about the position of the movable object in the goal area.

According to another embodiment, the present invention provides a method for determining information about a position of a movable object in a goal area in which at least two coils are attached in parallel to a goal area defined and bounded by a goal, wherein the first coil is attached in an area behind the goal and a second coil is attached closer to the goal than the first coil or identical to the goal, wherein the first coil and the second coil respectively comprise a coil impedance, wherein the coil impedance of the second coil is set so that a field of the second coil generated due to a magnetic field of the first coil reduces the magnetic field of the first coil at a location within the second coil by at least 20%, which may have the steps of generating a magnetic alternating field using the first coil; providing information about the magnetic alternating field which the movable object experiences at the position in the goal area; evaluating the information about the magnetic alternating field to obtain information about the position of the movable object in the goal area.

According to another embodiment, the present invention provides a computer program comprising a program code for performing the above-mentioned method, when the computer program runs on a computer or a microcontroller.

The findings of the present invention consist in that a position, direction and/or movement of a movable object and/or a ball may be determined by measuring the strength and/or orientation of a changing magnetic field at the location of the movable object. A system for determining the position of a ball includes, according to embodiments of the present invention, basically two coils arranged in parallel to a goal area bounded and defined by a goal, wherein a first coil is attached in an area behind the goal and a second coil is attached closer to the goal than the first coil or attached identically to the goal, i.e. for example runs within the goal frame. The first coil and the second coil respectively comprise a coil impedance, wherein the coil impedance of the second coil is set such that a magnetic field of the second coil generated due to a magnetic field of the first coil reduces the magnetic field of the first coil at a location within the second coil by at least 20%. In other words, a part of the magnetic alternating field caused by the first coil may cause an induction in the second coil which, due to its low overall impedance, may generate an opposing field to the magnetic field generated by the first coil. Thus, a magnetic field strength within the goal area spanned by the second coil is reduced.

According to one aspect, the present invention provides a system for determining information about a position of a movable object in a goal area, in which at least two coils are attached in parallel to a goal area defined and bounded by a goal, wherein a first coil is attached in an area behind the goal and a second coil is attached closer to the goal than the first coil or identical to the goal, wherein the first coil and the second coil respectively comprise a coil impedance, wherein the coil impedance of the second coil is set such that a field of the second coil generated due to a magnetic field of the first coil reduces the magnetic field of the first coil at a location within the second coil by at least 20%, having a device for providing information about a magnetic field which the movable object encounters at the position in the goal area, and a device for evaluating the information about the magnetic field to obtain information about the position of the movable object in the goal area.

According to embodiments of the present invention, the device for providing information about the magnetic field is located within the movable object or ball itself. Thus, using the information or a magnetic field strength, respectively, of the magnetic alternating field generated by the first coil it may be determined whether the ball has crossed the goal line or not. For this purpose, the ball, according to implementations, includes a chip on which a three-dimensional magnetic field sensor, a microcontroller, a transmit unit and a current supply are located. The ball permanently measures the magnetic field surrounding the same and transmits the strength of the field of all three space coordinates (x, y, z) to the device for evaluating the information about the magnetic field which is, for example, located in a central computer. The closer the ball gets to the first coil behind the goal, the higher the magnetic field strength measured by the ball of the magnetic field generated by the first coil, in the following also called first magnetic field. The field strength of the first magnetic field is not constant in the goal plane. By this, with regard to a determination of the location of the ball, ambiguities result which have to be corrected. For this purpose, further information is needed about a point of penetrating the goal plane.

According to embodiments this may be achieved by measuring a field strength and direction of the magnetic field generated by the second coil, wherein the magnetic field generated by the second coil is also referred to as the second magnetic field in the following. The first and second magnetic fields are here generated in a frequency-division multiplexing, i.e. with different frequencies, or in a time-division multiplexing, i.e. alternating in time.

A difference of the directions or orientations, respectively, of the first and the second magnetic field leads to an angle which gets larger, the further the ball is situated outside the center of the goal. In addition, the measured field strength of the magnetic field generated by the second coil changes, depending on whether the ball is located in the center of the goal or at the edge of the goal. The angle and the field strength of the second coil are, according to embodiments, used as parameters for correcting the field strength of the magnetic alternating field generated by the first coil. Now, the field strength of the first coil may be used to determine a distance of the ball to the goal plane.

According to embodiments of the present invention, the second coil is attached in or at the goal frame, respectively, and comprises an impedance which is as low as possible. Also a control electronics of the second coil comprises, according to embodiments, a very low impedance regarding alternating current. Thus, the second coil may act as a short-circuited secondary winding of the primary first coil, i.e. may be set into a short-circuit operation. A part of the magnetic alternating field caused by the first coil may thus cause an induction in the second coil. Due to the low overall impedance of the second coil, the current induced in the second coil may generate an opposing field to the magnetic field generated by the first coil. By this, field lines of the magnetic field of the first coil are attenuated in the area spanned by the second coil, i.e. the goal area. Outside the area spanned by the second coil, the opposing field and the magnetic field of the first coil may add up. By this, the overall magnetic field strength outside the second coil is increased. This strong field difference caused by the opposing field of the second coil at the outer boundaries of the second coil enables to determine extremely accurately whether the ball is inside or outside the goal.

According to a further aspect of the present invention, the second coil may be operated in a short-circuit operation or in an open-circuit operation by a switch. When the ball is in the proximity of the goal plane or in the goal area around the goal line, respectively, it may, depending on whether the switch is open or closed, measure a different magnetic field which is generated by the first coil behind the goal. If the switch of the second coil is open, the ball will measure an undisturbed magnetic alternating field of the first coil, which is strongest in the center of the goal and decreases in a characteristic way towards the goal edges. When the switch of the second coil is closed, the ball will measure a low magnetic field within the goal area bounded by the second coil using its electronics, outside the goal area a stronger magnetic field may be measured. In addition, a change of magnetic field directions may be measured when closing or opening the switch, respectively. With every measurement cycle, three measurement values are available, using which, according to embodiments, it may be calculated very accurately whether and where the ball crossed the goal plane. According to embodiments, a device for evaluating is thus implemented to provide an indication from a sequence of measurement values whether the movable object crossed the goal plane, wherein first information is information about a magnetic field of the first coil in an open-circuit or idle operation of the second coil, second information is information about a reduced magnetic field of the first coil in a short-circuited second coil and third information is information about a change between first information and second information.

In the direction perpendicular to the goal plane, the inventive system enables a relatively exact measurement of the field strength of the first coil. Parallel to the goal plane, without an influence of the second coil, a very low field change of the magnetic field generated by the first coil is measured. Thus, it would only partly be possible to see whether the ball flew past a goalpost or over the crossbar.

It is the advantage of the present invention that by the low impedance of the second coil a very strong signal difference may be embossed on an overall magnetic field generated by the first magnetic field and by the opposing field of the second coil, wherein this signal difference is located in particular at important locations like goalposts or the crossbar, respectively. Thus, it may be enabled that decisions regarding those critical positions are taken without occurring errors.

Thus, using the inventive concept there is the possibility of determining the position of a ball in a goal area or a goal plane, respectively, very precisely and thus be able to take a decision whether a goal has been scored without interrupting play.

Further, the inventive concept for deciding whether a goal has been scored is tolerant in view of persons, i.e. the influence of persons moving close to the movable object or the ball, respectively, or covering the movable object does not play any role.

BRIEF DESCRIPTION OF THE DRAWINGS

In the following, embodiments of the present invention are explained in more detail with reference to the accompanying drawings, in which.

DETAILED DESCRIPTION

Figure 1A:
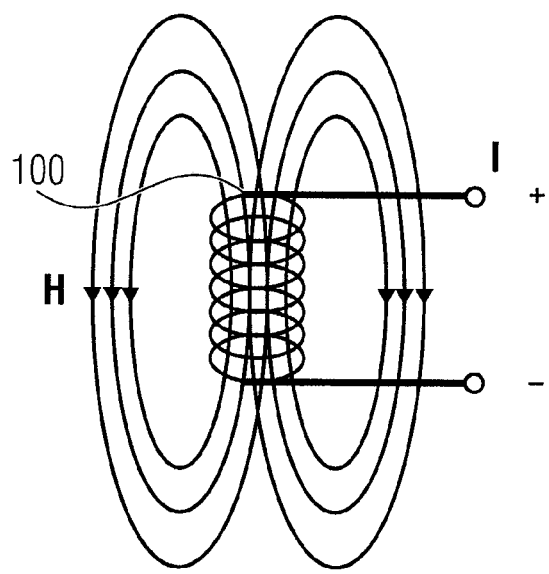
FIG. 1a shows a schematical illustration of magnetic field lines around a current-carrying cylinder coil for explaining the inventive concept.

Regarding the subsequent description it should be noted, that in the different embodiments like or similar functional elements comprise the same reference numerals and thus descriptions of those functional elements are exchangeable in the different embodiments illustrated in the following.

To explain the inventive concept for determining the position of a movable object using magnetic fields in more detail, FIG. 1a shows a schematical illustration of magnetic field lines around a cylindrical coil 100 carrying a current I.

As it is known, a magnetic field is connected to each moving charge (electrons in lines or in the vacuum), i.e. a current flow. The field quantity associated with the cause of the magnetic field is the magnetic field strength H, independent of the material characteristics of the area. For generating a static magnetic field, for example short cylinder coils or conductor loops may serve as magnetic antennas. In general, the magnetic field strength H decreases with an increasing distance from a current-carrying conductor or the current-carrying cylinder coil 100, respectively. If, for example, a measurement point is removed from the center of the coil 100 into the direction of the coil axis (x axis), then the field strength H of the magnetic field continuously decreases with an increasing distance x. This connection is shown as an example in FIG. 1b.

Figure 1B:
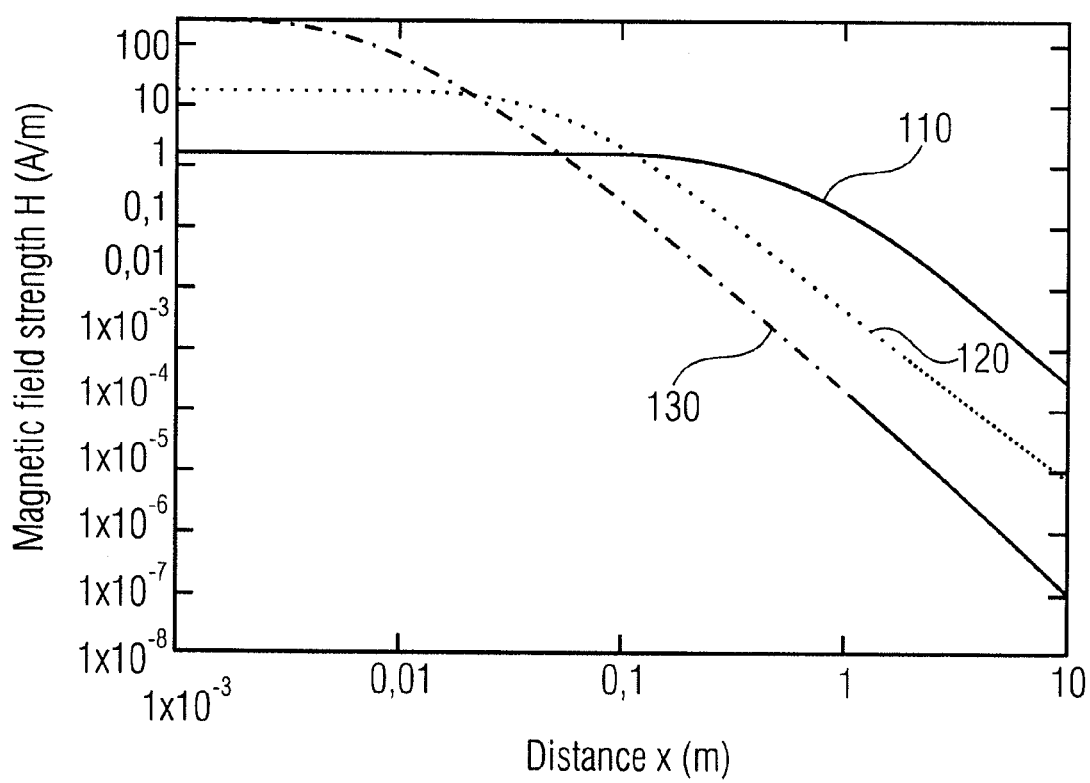
FIG. 1b shows a schematical illustration of a course of a magnetic field strength in a short range around a cylinder coil plotted over a distance from the cylinder coil.

In a logarithmic illustration FIG. 1b schematically shows a course of the magnetic field strength H in a short range of the current-carrying cylinder coil 100 with an increasing distance in the x direction, i.e. in the direction of the longitudinal coil axis. Here, the curve with the reference numeral 110 exemplarily designates a field strength course with a relatively large radius R of the windings of the coil 100. The curve with the reference numeral 120 accordingly designates a course of the magnetic field strength H with a medium winding radius R. Accordingly, the curve with the reference numeral 130 designates a schematical field strength course with a small winding radius R of the coil 100.

In the free space, the drop in the field strength in the so-called near field of the coil is first of all approx. 60 dB per decade, which then levels off to 20 dB per decade in the far field with an electromagnetic wave forming. At a closer look, it may be seen that the field strength H is almost constant depending on the radius (or the area) of the coil 100 up to a certain distance x, but then drops off. The magnetic field strength curves illustrated in FIG. 1b refer to a short range of the cylinder coil 100, i.e. an area around the cylinder coil 100 of a few meters. Thus it is possible to associate a distance x from the cylinder coil 100 to each magnetic field strength H. For example, as everybody knows, for a field strength course along the longitudinal coil axis x of a round coil carrying a current I the following relation results:

$$H = \frac{I \cdot N \cdot R^2}{2 \cdot \sqrt{(R^2 + x^2)^3}} \quad (1)$$

wherein N is the number of coil windings, R is the winding radius and x is the distance to the center of the coil in the x direction. As a boundary condition for the validity of the relation (1) h<<R holds true, i.e. a coil height h has to be much smaller than the coil radius, and x<λ/2π (λ=wave length), wherein in a distance x>2π a transition into the electromagnetic far field of the coil 100 begins.

The above-mentioned equation (1) only serves for illustrating the dependence of the magnetic field strength on the distance from a magnetic antenna or coil, respectively. Likewise, equations may be set up which describe a field strength course around a coil in the three-dimensional space. In addition to a magnitude of the magnetic field strength H, there is also an alignment or orientation, respectively, of a magnetic field vector $\vec{H}$. If the three components ($B_x$, $B_y$, $B_z$) of the magnetic field vector $\vec{H}$ are measured at the location of the movable object, according to one embodiment of the invention, using a system of equations, the space coordinates (x, y, z) of the location may be determined where the magnetic field vector $\vec{H}$ was measured. To be able to exclude ambiguities, generally measurement values of the magnetic field vector $\vec{H}$ of several coils are needed.

According to a further embodiment of the present invention it is possible to measure the magnetic field generated by the coil 100 three-dimensionally with a desired accuracy in a location determination area around the coil 100 and to store the measurement values or the components ($H_x$, $H_y$, $H_z$), respectively, of the field vector $\vec{H}$ for each relevant point in space, for example in a so-called lookup table and associate the same with the respective space coordinates (x, y, z) of the space points. Likewise, it is, of course, possible that the field strengths and field directions are, according to a further embodiment of the present invention, calculated in an interesting area around the coil using mathematical formulae to subsequently be associated to the corresponding coordinates (x, y, z) in a lookup table. If subsequently a field strength and the associated field direction are measured at a random location of the location determination area or the goal area, respectively, around the coil, then the measurement values may thereupon be compared to the previously measured or calculated and stored values from the lookup table. The data set which has the best matches finally designates the location of the measurement.

If the movable object or a three-dimensional magnetic field sensor integrated in the movable object, respectively, rotates, then it is generally not possible to associate the components (Hx, Hy, Hz) of a magnetic field measured by the magnetic field sensor to a point in space in the location determination area. In this case, however, according to one embodiment of the present invention, the magnitude of the measured magnetic field vector $|H|=(H_x^2+H_y^2+H_z^2)^{1/2}$ may provide information about the position of the movable object or the ball, respectively, in the location determination area or goal area, respectively. When only using one coil or only one magnetic field, respectively, ambiguities result with regard to the position, as curves or areas, respectively, exist around the coils on which the magnitude of the measured magnetic field vector |H| is respectively the same. If, however, at least two coils are used, which are arranged at different positions regarding the location determination area, then these ambiguities may be reduced or completely omitted, respectively.

This principle is now used according to embodiments of the present invention, for example to be able to determine a position of a ball by means of magnetic fields. As already mentioned above, for example in a football match one of the most controversial topics is whether in critical situations the ball crossed the goal line or not. For this purpose it is necessary that the position of the ball at the goal line may be measured with an accuracy of approx. +/−1.5 cm. An arrangement which enables a the determination of the position of a football by means of a magnetic field is schematically illustrated in FIG. 2.

Figure 2:
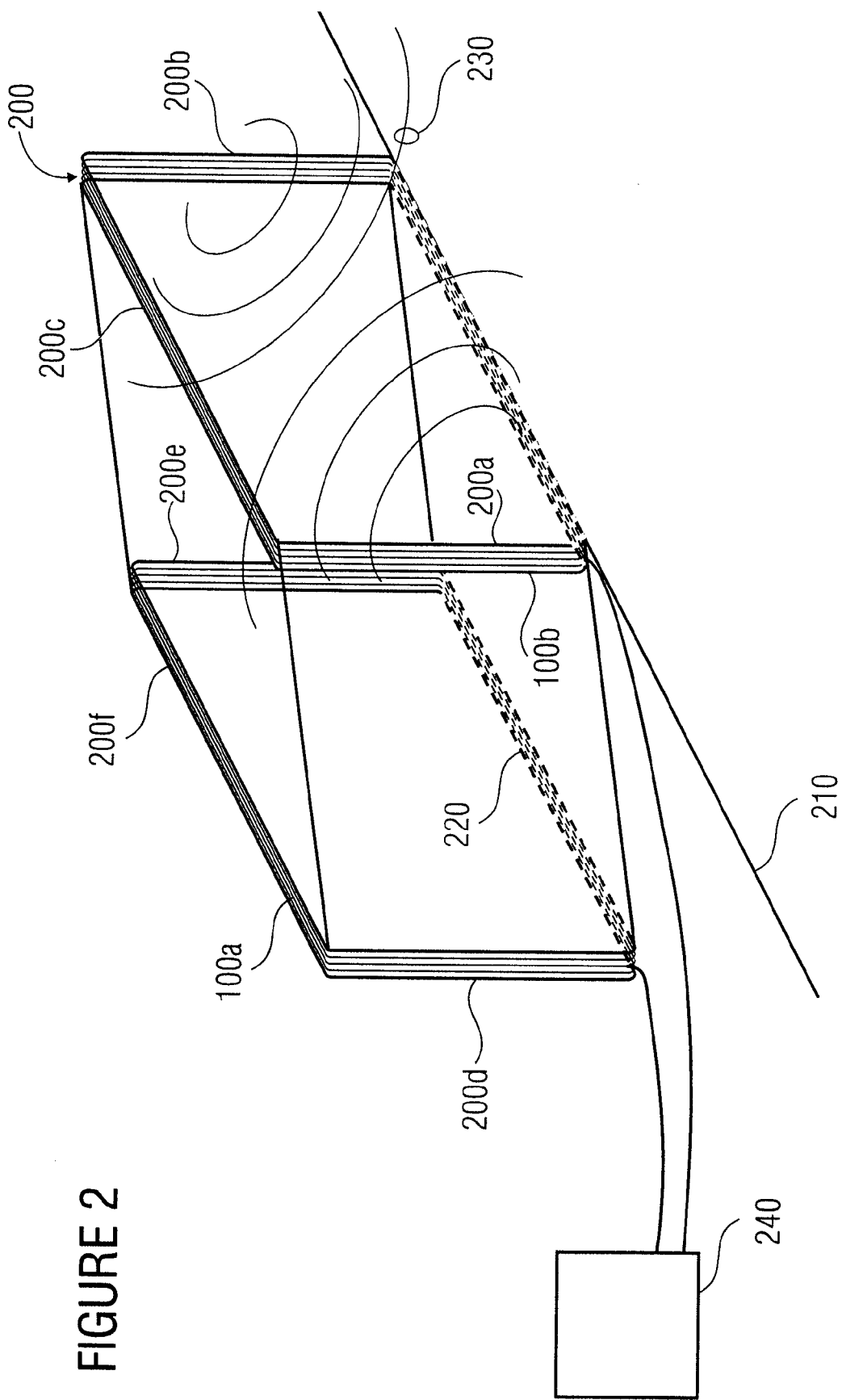
FIG. 2 shows a schematical illustration of a football goal with a first coil wound around an area bounded by the net suspension posts and the net suspension crossbar and a second coil wound around an area bounded by the goalposts and the goal crossbar, wherein the coils are coupled to a device for controlling the coils, according to one embodiment of the present invention.

FIG. 2 shows a football goal 200 comprising a first post 200a, a second post 200b and a crossbar 200c. Further, the goal 200 comprises a net suspension with a first net suspension post 200d, a second net suspension post 200e and a net suspension crossbar 200f. The goal 200 is positioned on a goal line 210 with its posts 200a, 200b.

The net suspension posts 200d,e, the net suspension crossbar 200f and an area 220 below the surface of the earth form a frame of a first rectangular coil 100a behind the goal 200 which is wound around the net suspension opening area according to one embodiment of the present invention in the net suspension posts 200d,e, in the net suspension crossbar 200f and in the area 220 below the surface of the earth.

The goalposts 200a,b, the crossbar 200c and the goal line 210 form a frame of a second rectangular coil 100b, which is, according to one embodiment of the present invention, wound around the goal opening area within the goalposts 200a,b, within the crossbar 200c and in an area below the goal line 210.

According to one embodiment of the present invention, the two coils 100a,b thus form a coil pair similar to a Helmholtz coil pair. Further, FIG. 2 shows, in an area in front of the goal 200, a movable object or a ball 230, respectively, whose position is to be determined. Further, FIG. 2 shows a device 240 for controlling the two coils 100a,b.

The two coils 100a,b are arranged at least approximately in parallel to a goal area defined and bounded by the goal 200. The first coil 100a is attached in an area behind the goal 200 and the second coil 100b is, according to the invention, attached closer to the goal 200 than the first coil or attached identically to the goal 200. A coil impedance of the second coil 100b is, according to an embodiment of the present invention, set such that a magnetic field of the second coil 100b generated due to a magnetic field of the first coil 100a reduces the magnetic field of the first coil 100a at a location within the second coil 100b at least by 20%.

According to embodiments, the first coil 100a may be attached behind the goal 200, for example at a net suspension of the goal 200, as it is exemplarily shown in FIG. 2. The coil opening area of the first coil 100a may be equal to or larger than the goal area defined by the goal 200. The center or center of gravity, respectively, of the first coil 100a is advantageously at least approximately identical to the center or the center of gravity, respectively of the goal 200, i.e. an axis passing perpendicular to a center of gravity of the bounded goal area passes at least approximately through the center of gravity of the coil opening area of the first coil. Apart from that, the first coil 100a is advantageously aligned absolutely in parallel to the goal 200. According to embodiments, the second coil 100b is attached in the goal frame as illustrated in FIG. 2. The second coil 100b may, however, also be mounted outside the goal frame, for example at a net fixation at the goal frame. A coil part of the second coil 100b which passes along the goal line 210 is advantageously buried a few centimeters below the goal line 210.

For determining whether the ball 230 crossed the goal plane, according to the invention the field strength of the magnetic field generated by the first coil 100a is determined at the location of the ball 230. For this purpose, the ball 230 for example comprises a chip on which a three-dimensional magnetic field sensor, a microcontroller, a transmit unit and a current supply are accommodated. The ball 230 or the three-dimensional magnetic field sensor, respectively, continually measures the magnetic field surrounding the same and transmits the strength of the field of all three space coordinates (x, y, z), for example to a central computer (not shown). In order to be able to reliably differentiate the magnetic fields of the coils 100a,b from the magnetic field of the earth and other magnetic fields, an alternating field is generated in each of the coils 100a,b.

According to embodiments, both coils 100a,b may emit an alternating field with a respectively different frequency, i.e. they are operated in a frequency division multiplex operation. For this purpose, a frequency of a magnetic alternating field of one of the two coils 100a,b may, according to embodiments, for example be in a range from 500 Hz to 5 kHz. The magnetic field sensor integrated in the ball 230 is, according to embodiments, connected to an electric filter, whereby the different frequencies may be separated and passed on to a field strength measurement. Thus, the ball 230 is able to separately detect the magnetic field strength of both magnetic fields generated by the coils 100a,b, each in the three directions of space, and transmit the same to a central control unit, like, for example, a personal computer.

The closer the ball 230 gets to the first coil 100a, the higher the magnetic field strength measured by the ball 230 or the magnetic field sensor, respectively. The magnetic field strength of the magnetic field generated by the first coil 100a or of the first magnetic field, respectively, is not constant in the goal plane, i.e. within the second coil 100b. This connection is schematically illustrated in FIG. 3.

Figure 3:
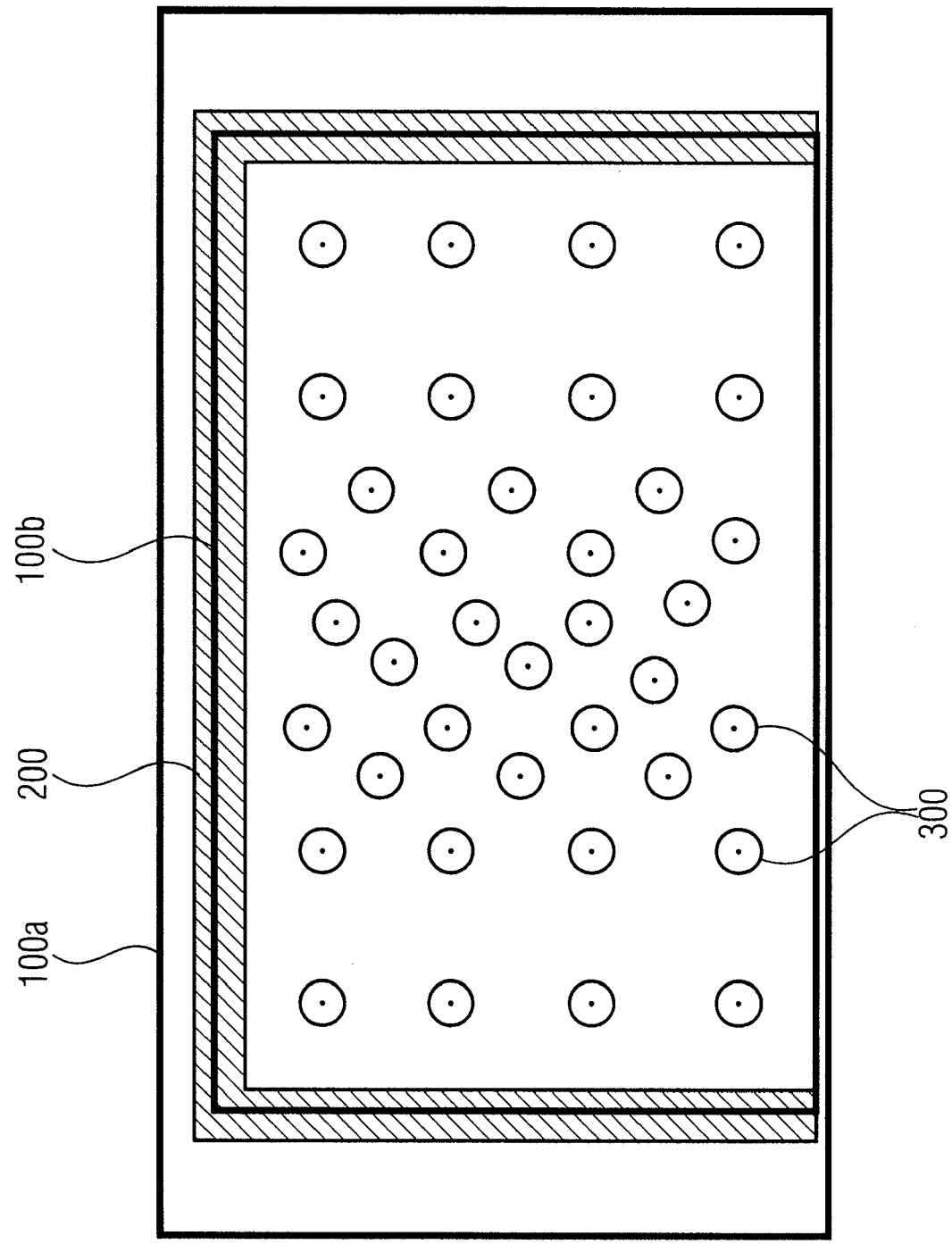
FIG. 3 shows a front view of a first coil behind a football goal and a second coil in a football goal and a field line course generated by the first coil within the area spanned by the second coil.

FIG. 3 schematically shows a front view of a football goal 200 with a first coil 100a arranged behind the goal 200 and a second coil 100b attached identically to the goal.

In the embodiment of the present invention illustrated in FIG. 3, the first coil 100a comprises a coil opening area bounded by its coil windings behind the goal 200 which is larger than the goal area of the goal 200 bounded by the goalposts 200a,b and the crossbar 200c. Due to the fact that the second coil 100b is attached identically to the goal 200, its opening area corresponds at least approximately to the goal area of the goal 200.

If only the first coil 100a is controlled by a device for controlling in order to generate a magnetic alternating field, and if the second coil 100b is operated in an open-circuit operation, then a distribution of magnetic field lines of the magnetic field generated by the first coil 100a results, as it is schematically indicated by reference numerals 300 in FIG. 3. Within the goal opening area of the goal 200, a magnetic field course of the first magnetic field results such that the magnitude of the first magnetic field within the goal opening area decreases from the center outwards. The magnitude of the magnetic field strength of the first magnetic field is indicated in FIG. 3 by the density of the magnetic field lines 300 directed out of the drawing plane. The denser the magnetic field lines 300, the higher the magnitude of the magnetic field strength and vice versa.

If a goal decision is to be taken, i.e. a decision whether the ball 230 crossed the goal line 210, ambiguities may result by this magnetic field strength distribution within the goal opening area which is not constant. Without further information, a device for evaluating can, for example, not assess whether the ball 230 crossed the goal plane close to a side post 200a,b, or whether the ball is located in front of the goal line 210 towards the field in an area close to an axis perpendicular to the center of gravity (middle) of the goal area. In order to clear up these ambiguities, further information is needed about the point of crossing the goal plane. This may be achieved by the fact that a field strength and a direction of the magnetic field of the second coil 100b is measured at the location of the movable object or the ball 230, respectively. The difference between the directions of the magnetic field of the first coil 100a and the magnetic field of the second coil 100b results in an angle α which becomes larger the further the ball 230 is located out of the center of the goal. This connection is schematically illustrated in FIG. 4.

Figure 4:
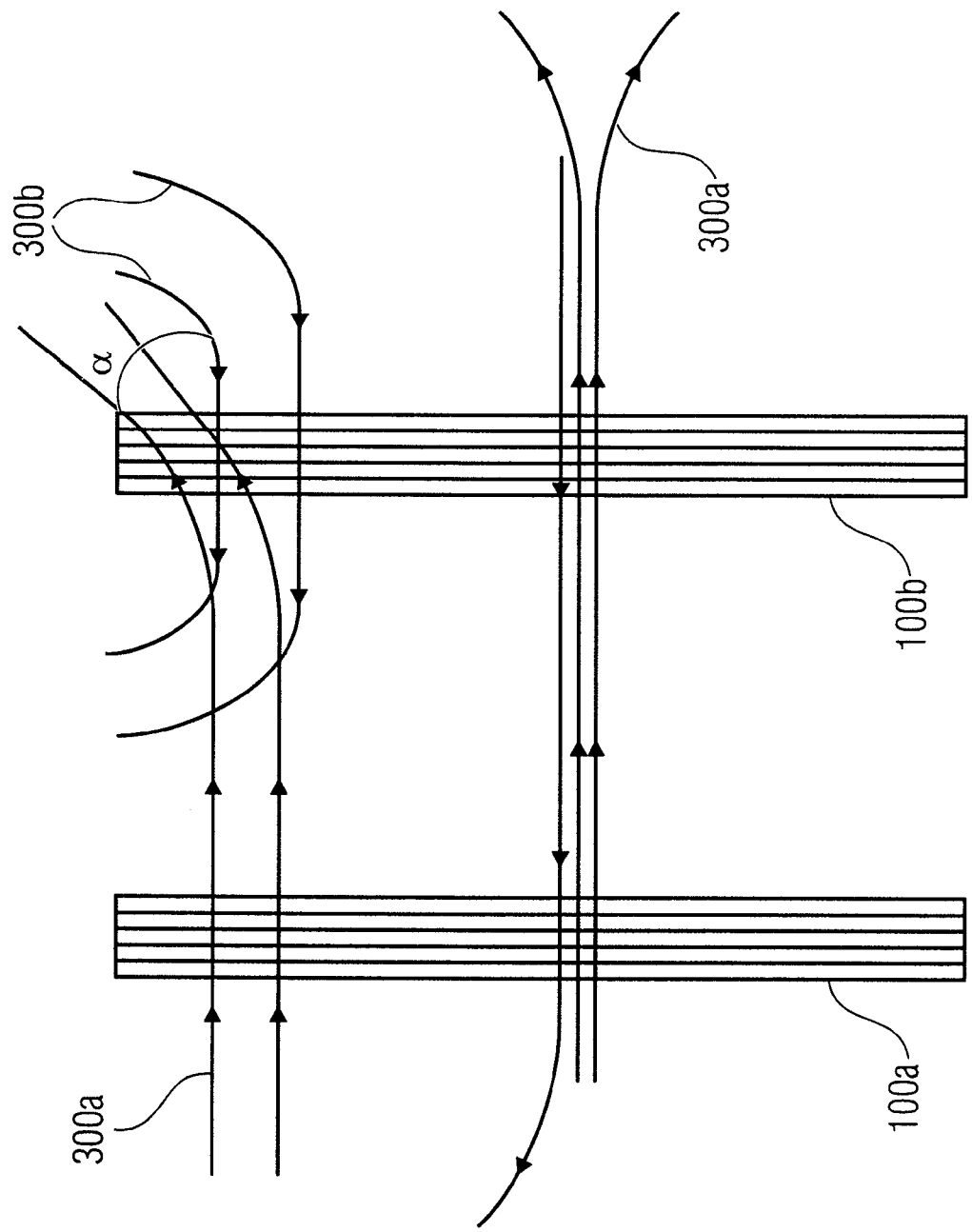
FIG. 4 shows a side view of a first and a second coil with a field line course of an undisturbed magnetic field generated by the first coil.

FIG. 4 shows a side view of a first coil 100a and a second coil 100b arranged in parallel of the same and a first field line course 300a of the magnetic field generated by the first coil 100a and a second field line course 300b of the magnetic field generated by the second coil 100b. In the example illustrated in FIG. 4, the orientations of the field lines 300a and 300b within the coil 100b are opposing.

As it may be seen in FIG. 4, in the center of the second coil 100b or the goal 200, respectively, an angle between the field lines 300a and 300b of approximately 0° results. If you go from the coil center of the second coil 100b outwards, then the angle α, designated by the reference numeral 310, increases with an increasing distance from the coil center, as it is illustrated in FIG. 4.

In addition to the angle α between the orientations of the magnetic fields, the field strength of the magnetic field generated by the second coil 100b measured by the ball 230 changes depending on whether the ball is located in the center of the goal or at the edge of the goal. This connection is schematically illustrated in FIG. 5.

Figure 5:
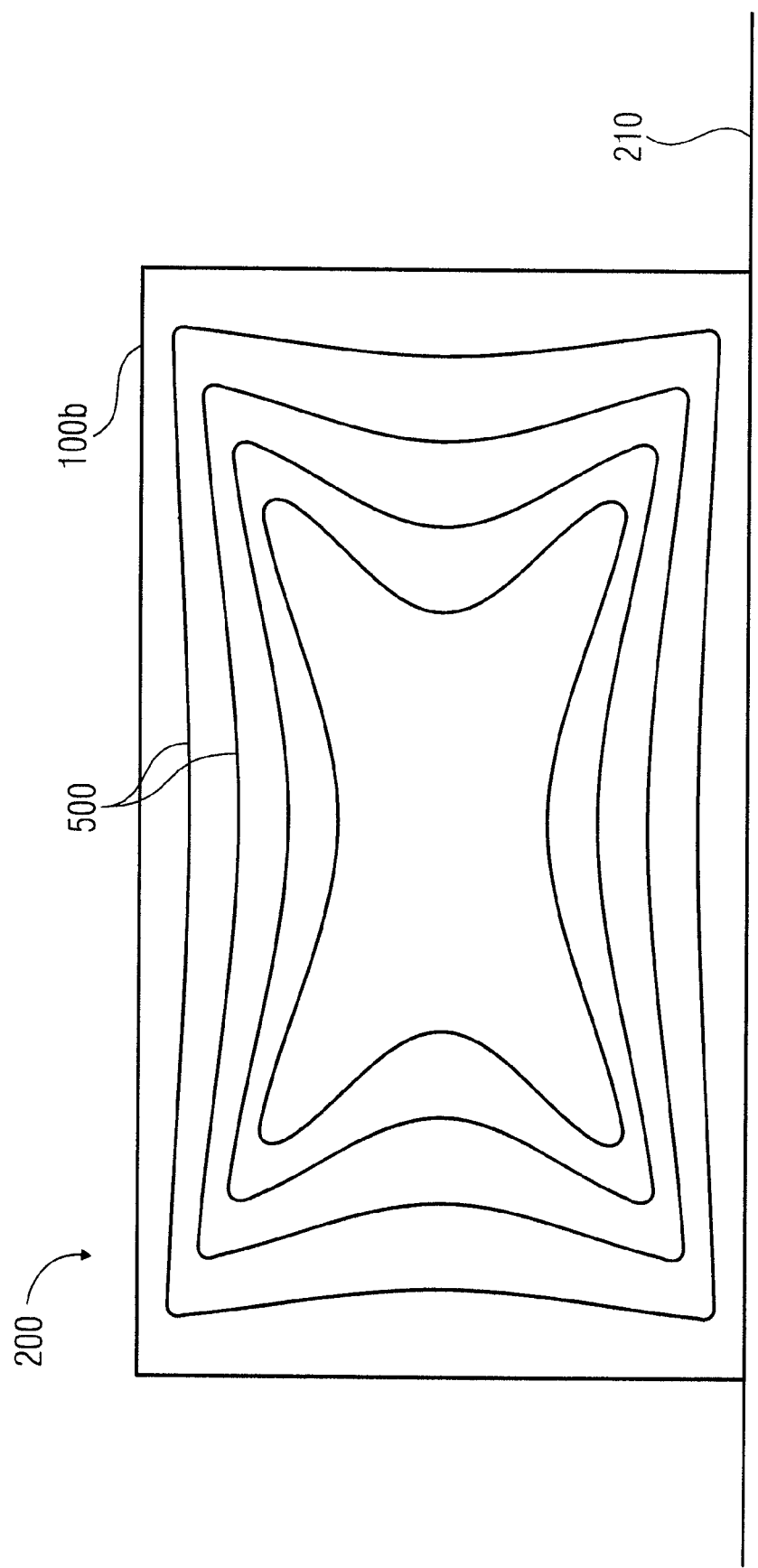
FIG. 5 shows a schematical illustration of a magnetic field strength distribution within a rectangular coil.

FIG. 5 shows a front view of the goal or coil opening area, respectively, of the second coil 100b. The lines designated by the reference numeral 500 schematically designate a field strength distribution within the rectangular coil 100b. Here, a small distance of two neighboring lines 500 designates a comparatively high field strength of the magnetic field at the respective location, wherein a large distance between two lines 500 designates a comparatively low magnitude of the magnetic field strength within the coil 100b. It may be seen from FIG. 5 that, in particular in the corner areas of the second coil 100b, there are higher magnetic field strengths than in the center of the coil 100b. This fact may, for example, also be shown analytically by the law of Biot-Savart. In general, a contribution $d\vec{H}$ of an infinitesimal line piece $d\vec{l}$ through which a current I flows with respect to the magnetic field $\vec{H}$ may be calculated in a point P according to $$d\vec{H}(\vec{r}) = \frac{Id\vec{l} \times \vec{r}}{4\pi r^3} \quad (2)$$

Here, $\vec{r}$ designates a connection vector from the line piece to the point P where the magnetic field is to be calculated. For any (not necessarily closed) conductor, the magnetic field H is obtained as an integral over the conductor according to $$\vec{H} = \frac{1}{4\pi} \int \frac{Id\vec{l} \times \vec{r}}{r^3}. \quad (3)$$

Due to the inhomogeneous distribution of the magnetic field within the second coil 100b illustrated in FIG. 5 ambiguities result with regard to the position of the ball 230. If only the first coil 100a would be used for determining the position of the ball 230, for example using a measured magnitude of the magnetic field, it would not be possible to differentiate whether the ball is located close to a corner of the second coil 100b or the goal 200, respectively, just before or behind the goal line 210, respectively, or, for example, in the center of the second coil 100b or the goal 200, respectively, on a level with the goal line 210. There will be a point close to the corner area of the coil 100b in front of the goal line at which the magnitude of the magnetic field strength is at least approximately as high as at a point in the center of the coil 100b on a level with the goal line 210 or in the plane, respectively, spanned by the goal line 210 and the football goal 200.

To be able to eliminate these ambiguities, the first coil 100a behind the goal 200 within the net suspension is advantageous. By separately measuring the magnetic fields generated by the first coil 100a and the second coil 100b at the location of the ball or the movable object 230, respectively, sufficient information may be obtained to be able to determine the precise position of the ball 230 within the goal area.

By adding the measurement values of the second magnetic field to the measurement values of the first magnetic field, it may now be determined whether the ball 230 is located close to a corner area of the coil 100b in front of the goal line 210, behind the goal line 210 or in the center of the coil 100b or the goal 200, respectively, on a level with the goal line 210. The angle α described with reference to FIG. 4 between the field lines 300a of the first and the second magnetic field 300b and the field strength of the second coil 100b described with reference to FIG. 5 are, according to embodiments of the present invention, also used as parameters for correcting the field strength of the first magnetic field. Thus, the field strength of the first magnetic field and the parameters may be used to determine a distance of the ball 230 from the goal plane.

According to further embodiments, both coils 100a,b may radiate a magnetic alternating field having the same frequency offset in time, i.e. they are operated in a time-division multiplex operation. Here, in a first time interval the first coil 100a is activated, while the second coil 100b is switched off, and the magnetic field generated by the first coil 100a is measured by the ball 230 or the magnetic field sensor in the ball, respectively. In a second time interval, the second coil 100b is activated, while the first coil is switched off, whereupon the ball 230 measures the second magnetic field. Also here, the angle α between the field line 300a of the first and the second magnetic field 300b and the field strength of the second coil 100b are used as parameters for correcting the field strength of the first magnetic field.

It is an advantage of this embodiment that only one frequency is needed and thus the number of components in the ball may be reduced. Apart from that, measurement errors by a possible mutual influence of the filters in the ball may be prevented.

In certain situations, in a football match a football may reach velocities of up to 140 km/h, i.e. approx. 40 m/s. If a measurement accuracy of approx. +/−1.5 cm is requested, advantageously the overall measurement cycle of the two coils 100a,b should happen within a timeframe of approx. 375 μs. The time interval of the measurements of the first and the second magnetic field should not be selected too large in this implementation. A time interval which is too high would have negative effects on the accuracy of the determination of the position.

It is important for a goal decision that it may be seen whether the ball 230 is within or just about outside the goal, i.e. for example just about outside the goal 200 at a side post 200a,b or the crossbar 200c. In order to be able to easily and reliably decide about this, the second coil 100b which is applied at or in the goal frame, respectively, comprises an impedance which is as low as possible according to an embodiment. According to embodiments, also control electronics of the second coil comprise a very low impedance regarding alternating currents. For this reason, the second coil 100b may act as a short-circuited secondary winding of the primary first coil 100a. This has the consequence that a part of the magnetic alternating field caused by the first coil 100a causes an induction in the second coil 100b in or at the goal frame, respectively. Due to the low overall impedance of the second coil 100b and its control electronics, the current induced in the coil 100b generates an opposing field to the magnetic field of the first coil 100a. By this, the magnitude of the field strength of the first magnetic field in the area spanned by the second coil 100b, i.e. the goal opening area, is reduced. Outside the area spanned by the second coil 100b or the goal opening area, respectively, the opposing field may be summed up to the alternating field of the first coil 100a. By this, the field strength outside the second coil 100b may be increased, whereas the field strength within the area spanned by the second coil 100b is reduced. This connection is explained in the following with reference to FIGS. 6 and 7.

Figure 6:
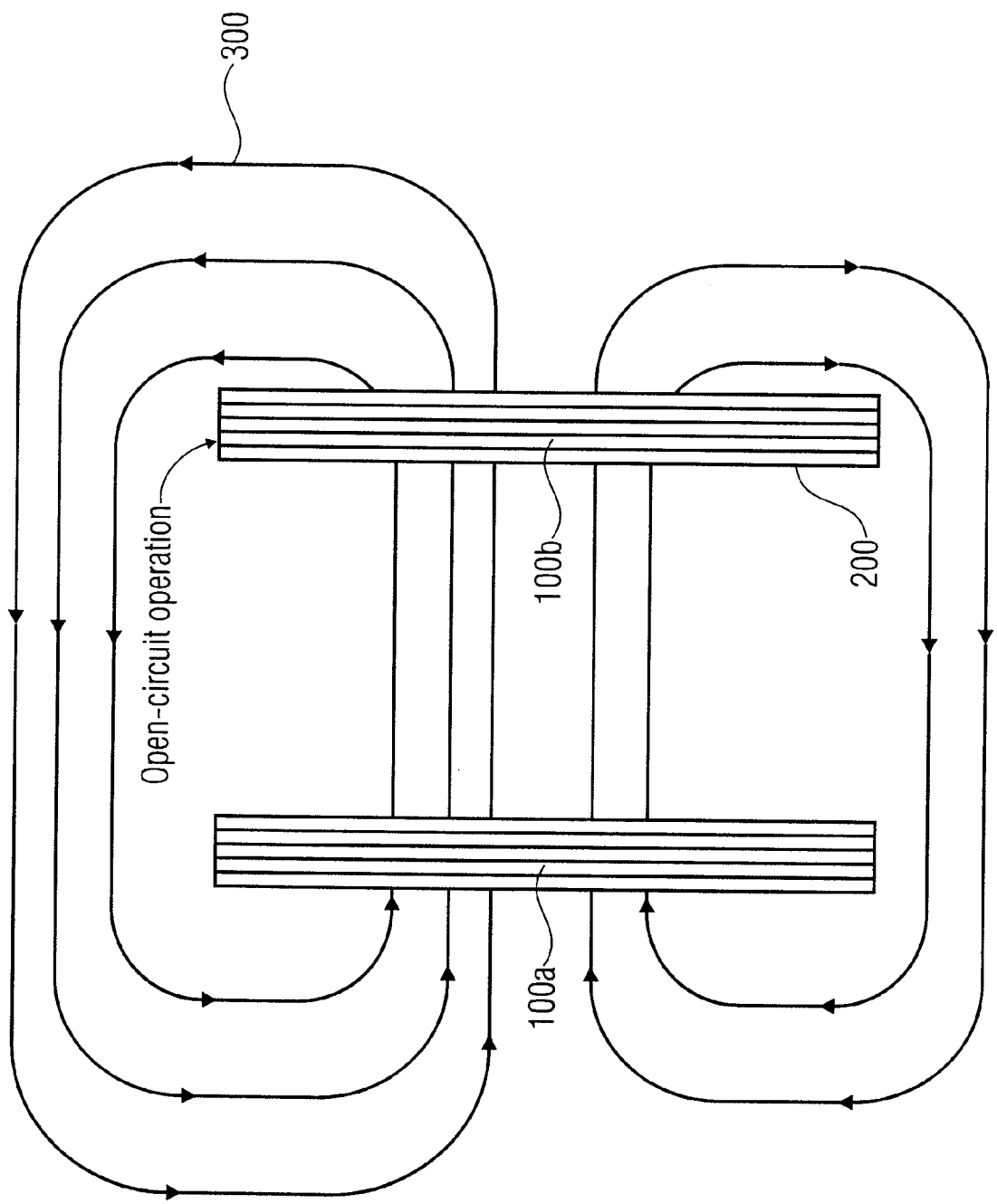
FIG. 6 shows a side view of a first coil generating a magnetic field and an idle or open-circuited second coil with a resulting field line course, according to one embodiment of the present invention.

FIG. 6 shows the scenario already described with reference to FIG. 3 in a side view. FIG. 6 shows a first coil 100a and a second coil 100b, wherein the first coil 100a is attached in an area behind the goal 200 and the second coil 100b is attached closer to the goal 200 than the first coil 100a or identically to the goal 200. In the scenario illustrated in FIG. 6, the second coil 100b is in an open-circuit operation, i.e. no current may flow through the coil windings. The first coil 100a behind the goal is controlled such that it generates a magnetic alternating field with a predetermined frequency. The resulting field lines are indicated by the reference numeral 300 in FIG. 6.

If the second coil 100b is in an open-circuit operation, the magnetic field of the first coil 100a may propagate undisturbedly and an "undisturbed" field line course results, as it illustrated exemplarily in FIG. 6.

Figure 7:
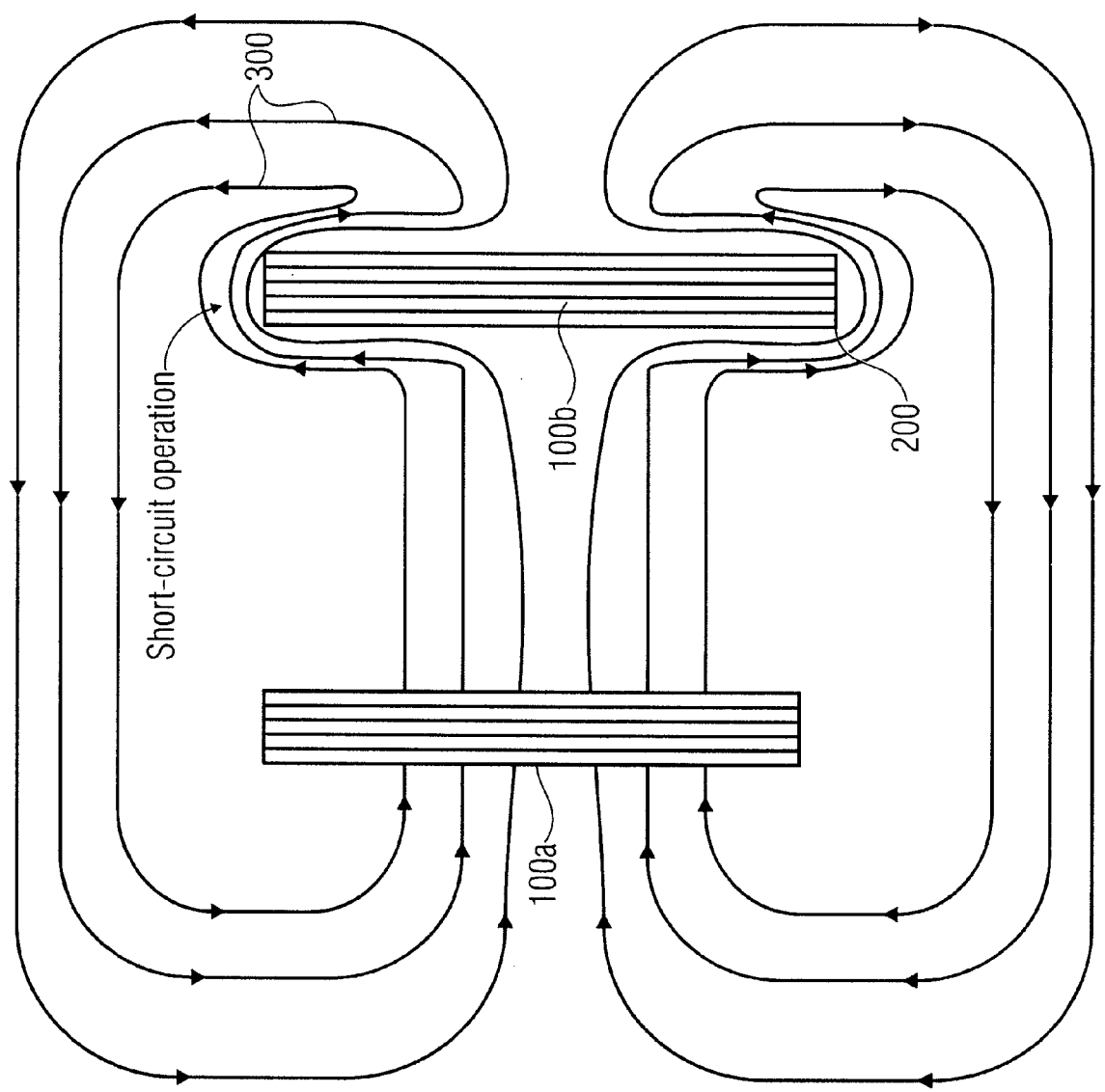
FIG. 7 shows a side view of a first coil generating a magnetic field and a short-circuited second coil with a resulting field line course according to one embodiment of the present invention.

If the second coil 100b attached at or in the goal frame, respectively, of the goal 200 is used in a short-circuit operation, however, then, as already described above, an opposing field to the first magnetic field of the first coil 100a is generated by the second coil 100b. By this, a field line course in the close proximity of the second coil 100b results, as it is schematically shown in FIG. 7.

Due to the low impedance of the second coil 100b in the goal frame, by the induced current, an opposing field is generated which ideally makes the area spanned by the second coil 100b field-free. The ideal case results exactly when the second coil 100b comprises a coil impedance $Z_{sp}=0$. This ideal case, will, however, not be realizable in practice, which is why in the area spanned by the second coil 100b only an attenuation of the first magnetic field may be achieved, for example by at least 20%. The compensation or the attenuation, respectively, of the magnetic field generated by the first coil 100a is strongest close to the coil windings, i.e. to the goalpost, the crossbar and the goal line, and thus enables to determine extremely accurately whether the ball 230 is inside or outside the goal 200.

According to an embodiment of the present invention, only the first coil 100a behind the goal 200 is used for generating a field. As already described above, the magnetic alternating field of the first coil 100a may generate a current in the second coil 100b which acts against its cause, the first magnetic field. According to embodiments, the current is only generated sufficiently when the second coil 100b is short-circuited and comprises a low impedance. According to embodiments of the present invention the coil impedance of the second coil is in a relevant frequency range (500 Hz to 5 kHz) in an impedance range between 0 and 100 Ohms.

According to further embodiments, an electronic switch may be used for periodically short-circuiting the second coil 100b.

When the ball 230 is located in the goal plane, it will measure a different magnetic field depending on whether the switch is closed or not. If the switch is open, the magnetic field sensor in the ball 230 will measure an undisturbed magnetic field of the first coil 100a which is strongest in the center of the goal 200 and decreases towards the goal edges in a characteristic way, as was already described above. If the switch is closed, the magnetic field sensor of the ball 230 will measure a low field in the center of the goal, and outside the area spanned by the second coil 100b it will measure a stronger field. Additionally, a change of field direction may be measured when closing or opening the switch, respectively. After every measurement cycle, according to embodiments, three measurement values are available, using which it may be calculated very accurately whether and where the ball crossed the goal plane. It may, for example, be determined using the field strengths whether the ball is located in front of or behind the goal line 210, respectively, and using the change of the field direction a statement may be made whether the ball crossed the goal opening area close to one of the side posts 200a,b, close to the crossbar 200c or close to the goal line 210. Further, due to the signal difference or field strength difference, respectively, which is very large at the edge of the goal 200, it may be determined, when the switch is closed, whether the ball 230 only just passed the goal 200 or not.

It is one advantage of this embodiment that electronics within the ball 230 may be implemented relatively simply as here only one frequency, i.e. the frequency of the first coil 100a, is measured and no frequency differentiation between the first and the second magnetic field is necessary.

If only one piece of information is needed about whether the ball 230 crossed the goal line 210 within the area spanned by the second coil 100b or not, then the inventive concept may be used for providing this piece of information. For this purpose, according to embodiments, a device for evaluating is implemented to provide an indication whether the movable object 230 crossed the goal plane from information about a time course of a magnetic field experienced from the movable object 230. Here, the device for evaluating may be located within the ball 230 or outside the same, for example in a personal computer. The device for evaluating is further implemented to provide the goal statement by means of a derivation of the time course of the magnetic field over time, wherein the derivation of the time course of the magnetic field over time is approximately zero at the point of time of crossing the goal line. This connection is illustrated in FIG. 8.

Figure 8:
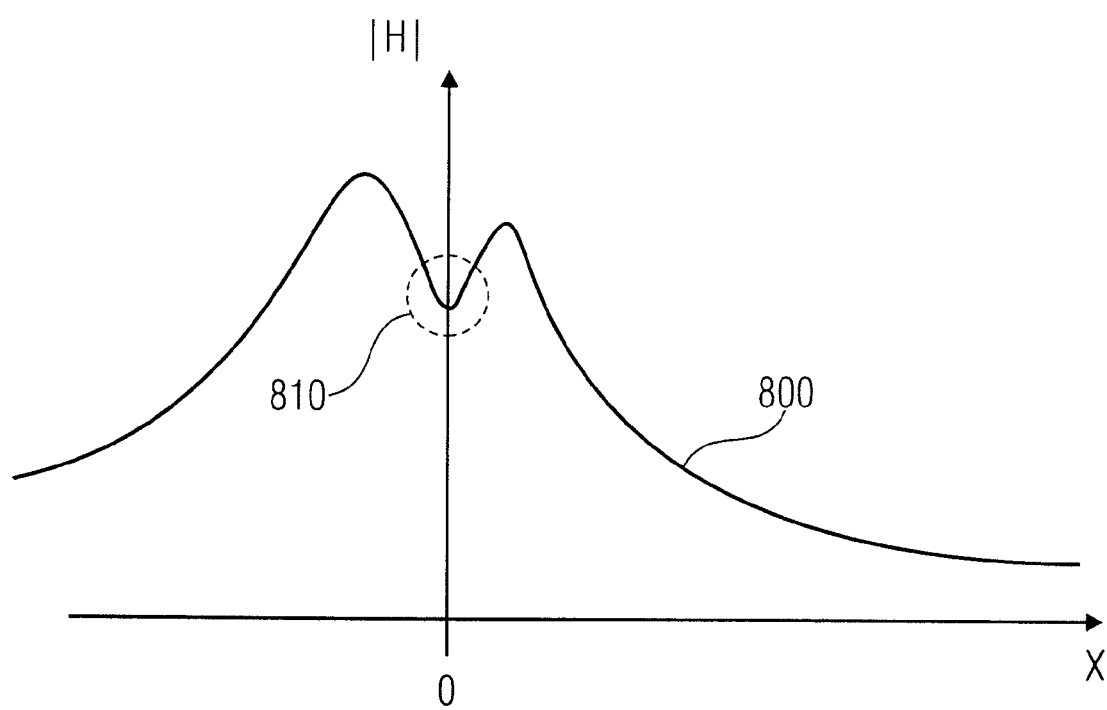
FIG. 8 shows a schematical illustration of a field strength course plotted over a distance from the goal line.

FIG. 8 shows a course of the magnetic field strength in the proximity of the goal 200 with a short-circuited secondary coil 100b and a primary coil 100a generating a magnetic alternating field. As already described above, within the area spanned by the second coil 100b by the opposing magnetic field a reduction of the magnetic field of the first coil 100a is achieved. Accordingly, a movable object 230 moving towards the goal 200 in the goal area will experience a field strength time course as it is exemplarily shown in FIG. 8.

Coming from the positive x direction, the ball will first experience an increasing course of the field strength 800 which decreases when the ball crosses the area spanned by the second coil 100b, i.e. the goal opening area. At this moment, the field strength time course comprises a local minimum 810. After crossing the goal opening area in the negative x direction, the field strength course increases again, as illustrated in FIG. 8, to finally drop off again behind the first coil 100a.

Thus, according to embodiments of the present invention, a decision about whether a goal has been scored (goal decision) may be brought about based on a detection of a minimum of the magnetic field time course. The conditions for a minimum of the time course of the magnetic field strength are $d|H|/dt=0$ and $d^2|H|/dt^2>0$, wherein the absolute value $|H|$ of the magnetic field strength may be calculated from the components ($H_x$, $H_y$, $H_z$) of a magnetic field measured by the magnetic field sensor in a point of space according to $|H|=(H_x^2+H_y^2+H_z^2)^{1/2}$. Using a sequence of magnetic field measurement values sent by the ball 230 and a corresponding logic the two above-mentioned conditions may thus be continually checked.

According to further embodiments of the present invention, a criterion for a decision about a goal may also be a change of sign of the first derivation $d|H|/dt$. When crossing the maximum of the magnetic field course, in general a change of sign from "−" to "+" takes place, as the magnetic field strength, with an approximation to the goal line 210, first decreases to then increase again after crossing the same.

In addition, further events may be inferred from the course of the first derivation $d|H|/dt$ of the time course of the magnetic field strength. If the first derivation comprises a discontinuity at a certain point in time, it may be assumed that the ball, for example, touched a side post or the crossbar, respectively.

To be able to clear up ambiguities, for example a Doppler frequency may additionally be evaluated which occurs due to a movement of the movable object 230 towards the goal 200 or away from the same.

Here, the device for evaluating may be implemented to obtain the goal statement by comparing the measurement values of the sequence of measurement values to predetermined values which are, for example, stored in a lookup table.

Figure 9:
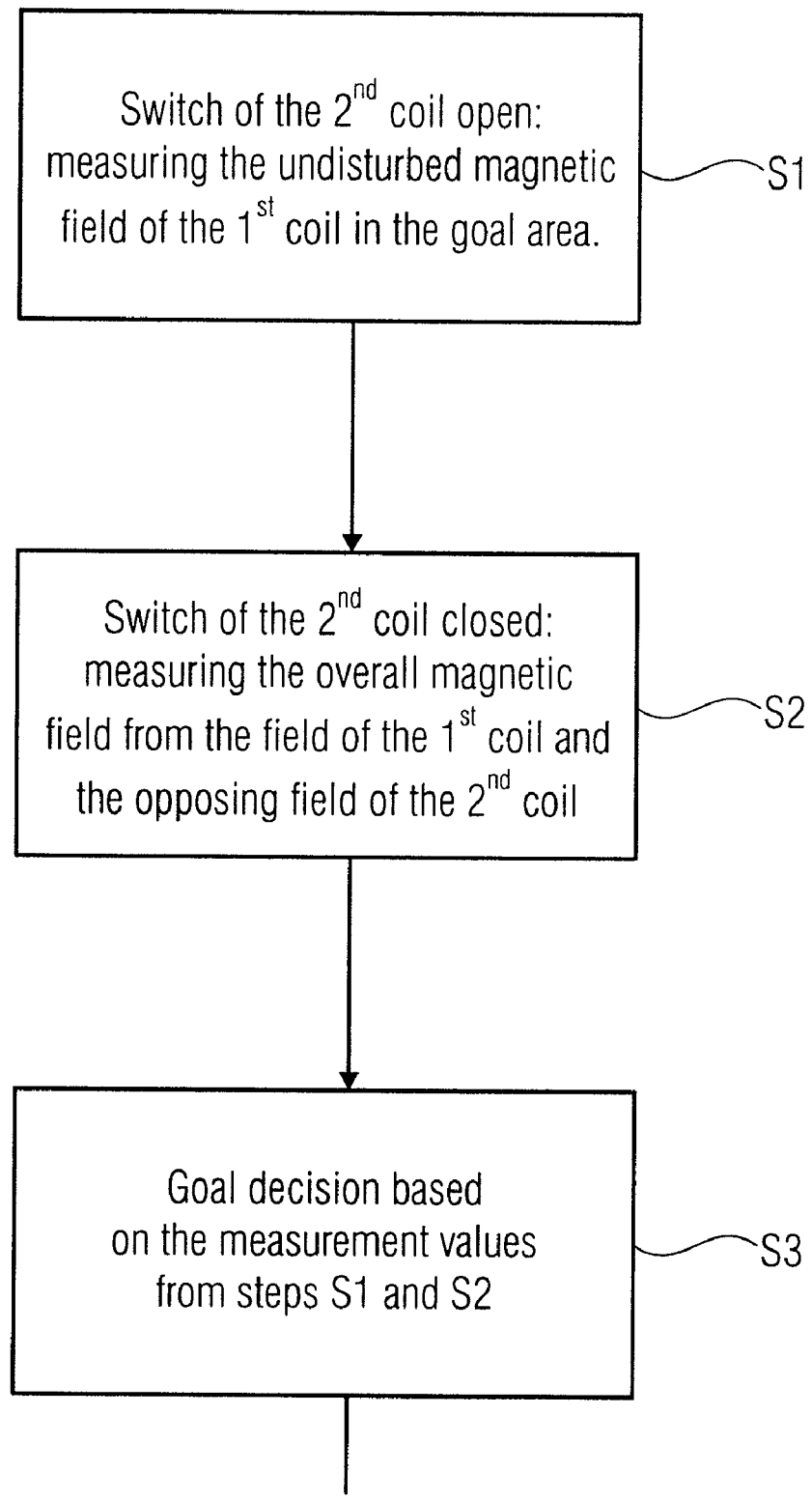
FIG. 9 shows a flowchart for illustrating a method for taking a goal decision according to one embodiment of the present invention.

A method for taking a goal decision based on information about a position of a movable object in a goal area according to one embodiment of the present invention is illustrated in summary in FIG. 9.

In a first step S1 the switch of the second coil 100b is open (open-circuit operation), wherein a measurement of an undisturbed magnetic field of the first coil 100a is performed in the goal area by the movable object or the ball 230, respectively. In a second step S2 the switch of the second coil 100b is closed (short-circuit operation) to perform a measurement of the overall magnetic field from the magnetic field of the first coil 100a and the opposing field of the second coil 100b. In a third step S3 a goal decision may be taken based on the measurement values from the steps S1 and S2.

Figure 10:
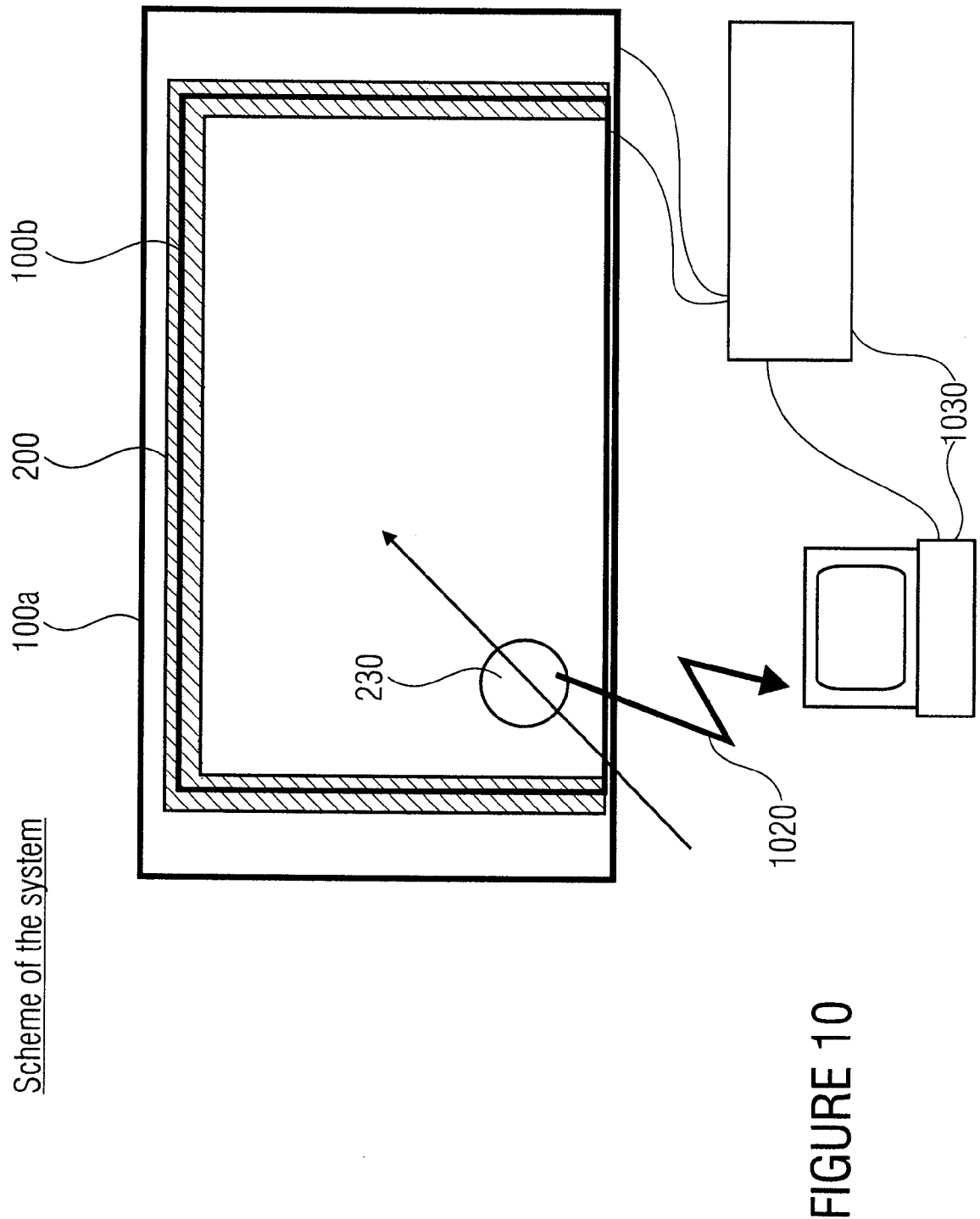
FIG. 10 shows a schematical illustration of an inventive system for generating a magnetic field in a goal area.

Finally, FIG. 10 and FIG. 11 again give an overview over a system for determining information about a position of a movable object 230 in a goal area, wherein FIG. 10 illustrates a front view and FIG. 11 a side view.

FIG. 10 illustrates a front view of a goal 200, behind which a first coil 100a is located. A second coil 100b is attached closer to the goal 200 than the first coil 100a or attached identically to the goal 200. The two coils 100a,b are connected to a means 240 for generating coil activation signals for the two coils 100a,b using a frequency-division multiplex operation. A coil activation signal is here a current or a voltage. FIG. 10 further shows a movable object 230 or a ball, respectively, which is connected, via a radio link 1020, to a device 1030 for evaluating the information about the magnetic field.

Figure 11:
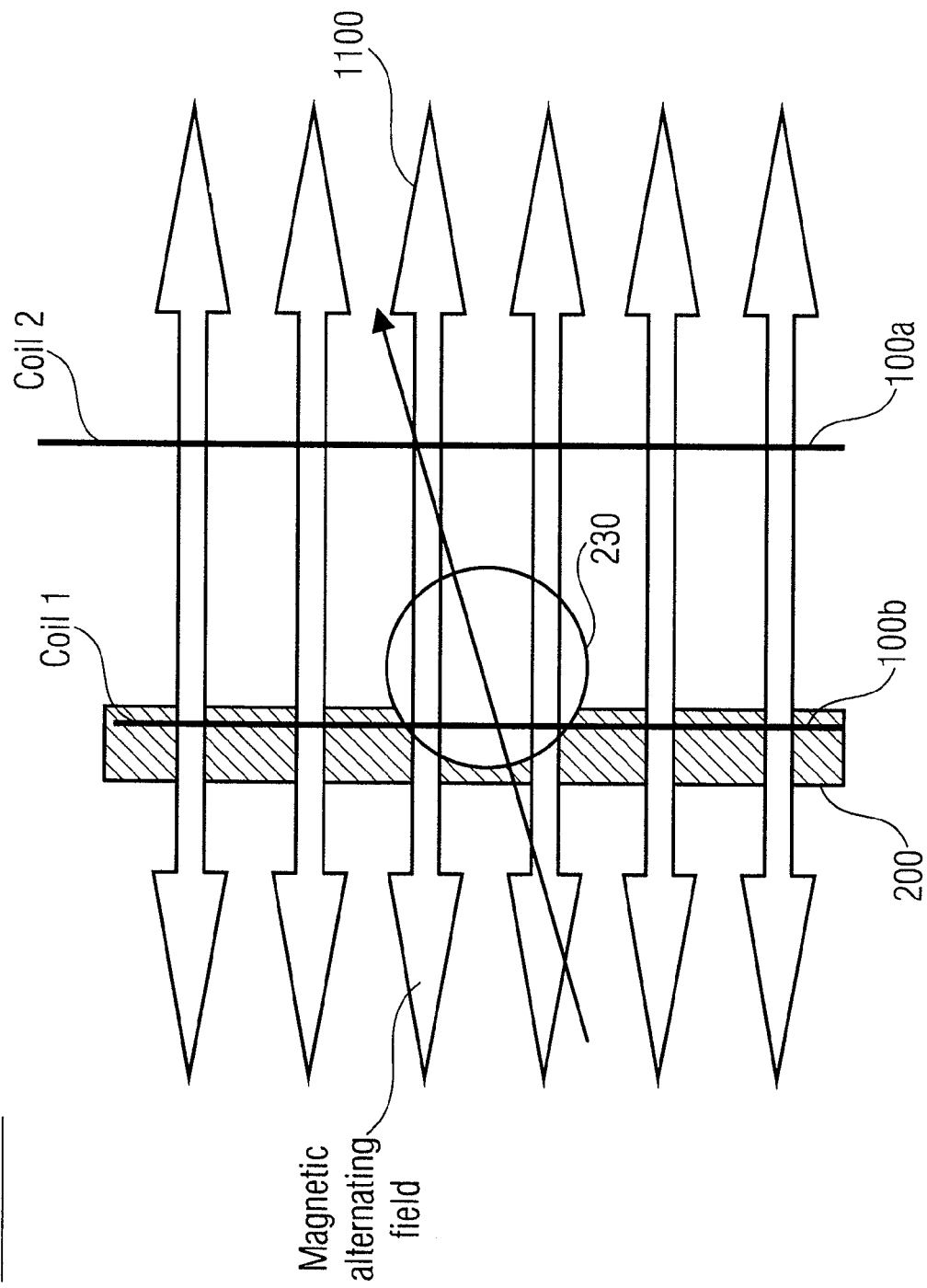
FIG. 11 shows a side view of a first coil and a second coil in a goal frame according to one embodiment of the present invention.

FIG. 11 shows another side view of a goal 200, a first coil 100a attached behind the goal 200 and a second coil 100b attached identically to the goal 200. A ball 230 may detect a magnetic alternating field 1100 of the first coil 100a and/or the second coil 100b when crossing the goal plane, as was already described above.

The device 1030 for evaluating is implemented, according to embodiments, to provide an indication from information about a time course of a magnetic field experienced by the movable object 230 whether the movable object 230 crossed the goal plane.

According to embodiments, the ball 230 includes a device for providing information about the magnetic field in which the movable object 230 is located which includes a magnetic field sensor. The device for providing is implemented to provide both information about the magnetic field generated by the first coil 100a and also information about the magnetic field generated by the second coil 100b. For this purpose, it comprises, for example, an electric filter to be able to separate the magnetic alternating fields regarding frequency. The ball 230 further includes a transmitter for transmitting at least one measurement value and a controller for controlling the magnetic field sensor or the transmitter, so that magnetic field measurement values may be sent. Here, the magnetic field sensor is a three-dimensional magnetic field sensor which may, for example, be assembled using Hall sensors or magneto-resistive elements.

The movable object or the ball 230, respectively, further necessitates an energy supply means for energy supply. The energy supply may, for example, be guaranteed by a battery in the ball 230. In order to guarantee a long lifetime of the energy supply of the ball, it is, for example, possible to be able to activate and deactivate the same. This should advantageously take place so that as few interruptions of play as possible are necessary. The ball 230 may be activated in the proximity of the goal 200 via a weak signal which is, for example, sent from a respectively implemented transmitter of a central control/evaluation means. For this purpose, the ball for example comprises a receiver which receives the activation signal and thereupon activates the measurement system in the ball in the proximity of the goal 200 via a processor. The processor, for example, switches on the receiver in the ball briefly every 100 milliseconds. As soon as the activation signal is detected by the ball, the ball enters steady-state operation.

Further, also the magnetic field generated by an inventive device may be used as the activation signal. When the ball 230 gets into the proximity of the goal 200, then this is detected by the three-dimensional magnetic field sensor in the ball. As soon as this is the case, the measurement system in the ball switches on. Also here, for example, the sensors may only be put into operation briefly every 100 milliseconds.

In the two procedures described above a detection is only switched on briefly to save energy. If the ball 230 does not detect a signal any more over a long period of time, for example one day, a timer for detection is, for example, set to ten seconds. Thereby, the energy consumption may again be decreased drastically. As, for example, the state of a battery in the ball may be sensed, it is guaranteed that a timer in the ball is, for example, set to 100 milliseconds again at the beginning of the match.

If conductive objects (including persons) move in a magnetic field, then a magnetic field may be induced within these objects. This magnetic field might influence the field geometry of the generated magnetic field. In a football match the players do not move as fast, however, so that a noticeable induction could be caused. The ball 230, however, may reach velocities of up to 140 km/h. Thus, it is to be considered in an implementation that the electronics within the ball 230 is as small as possible and comprises no large conductive areas.

An influence on the generated magnetic field by power cables close to the goal 200 is relatively low. A power cable comprises usually at least one go and return conductor so that the magnetic fields of the go and return conductor cancel each other out. Even with individual conductors, the influence would be relatively low, as with a network frequency of 50 Hz, the field influence would be equal to a slight change of the magnetic field of the earth.

The described system is very accurate in the direction perpendicular to the goal plane by measuring the field strength of the field generated by the first coil 100a. Alongside the goal plane, only a very low field change of the magnetic field is measured from the first coil 100a. By the low impedance of the second coil 100b, the field of the first coil 100a is embossed with a very strong signal difference which is located exactly at important locations like the posts 200a,b or the crossbar 200c, respectively. Therefore it is possible to decide about those critical positions error-free. If only one piece of information is needed about whether a movable object or a ball 230, respectively, crossed the goal line 210 within the goal 200, then by monitoring the time course of field strength measurements and by the detection of a minimum of the time course, a goal decision may be taken.

Figure 12:
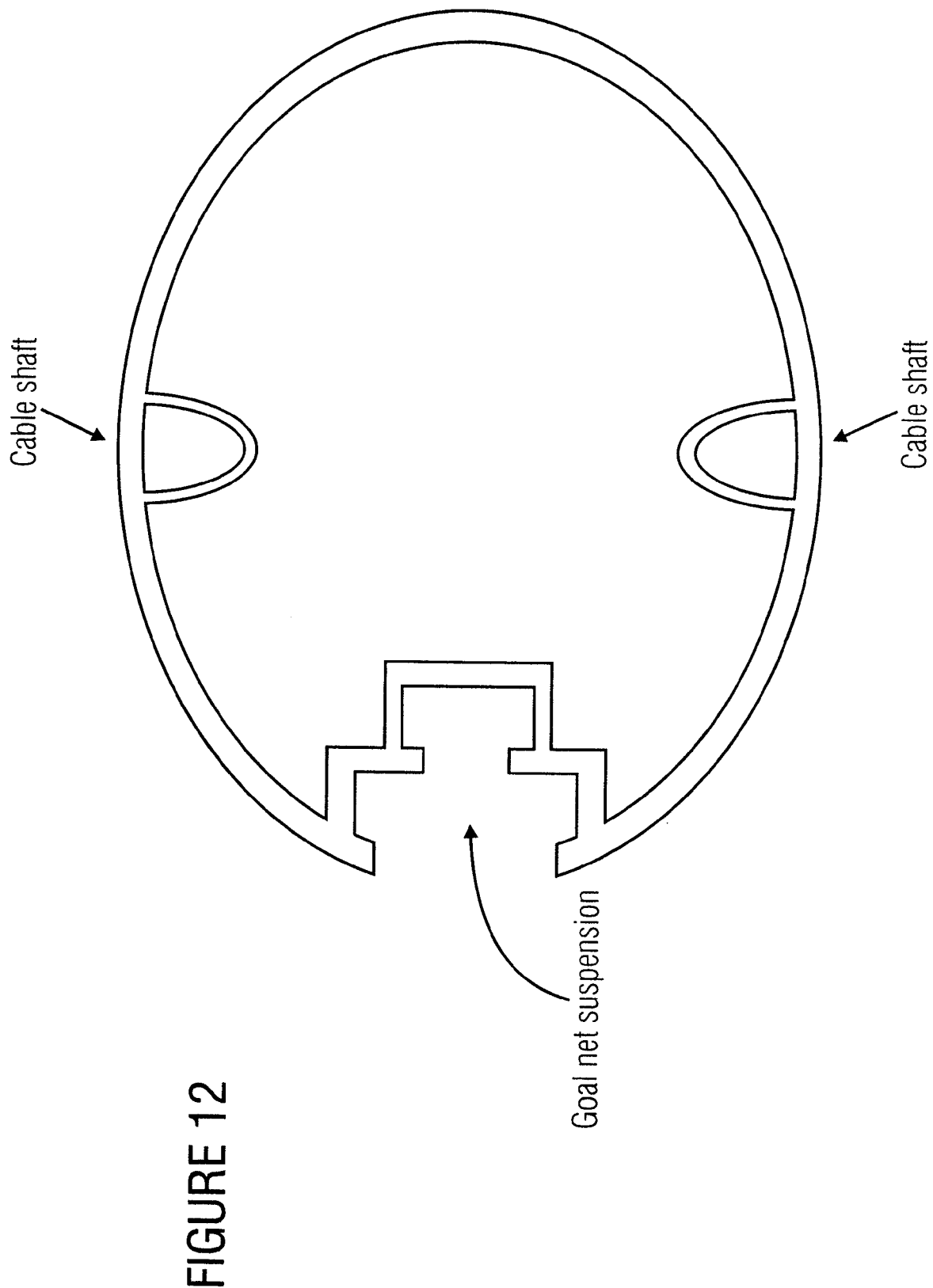
FIG. 12 shows a cross-section through a goalpost having cable channels.

FIG. 12 shows a cross-section through a goalpost with cable channels. At the back part of the goalpost, further the goal net suspension is located which may, for example, be implemented like a curtain rail. The cable shafts are manufactured symmetrically so that each and the same goalpost may be manufactured for the left and the right post. Thus, it is advantageous to provide the outer shaft with a cable to obtain a coil, using which the magnetic field may be generated. The interior shaft remains empty in this case. The crossbar may only have one single shaft which is arranged at the top with reference to the goal. Advantageously, the shaft is dimensioned such that it is just big enough for a cable to be inserted, and that the position of the cable in the shaft, however, is predetermined as far as possible and will only deviate slightly from goal to goal.

In particular, it is noted that, depending on the circumstances, the inventive scheme may also be implemented in software. The implementation may be on a digital storage medium, in particular a floppy disc or a CD, having electronically readable control signals which may cooperate with a programmable computer system and/or a microcontroller so that the corresponding method is performed. In general, the invention thus also consists in a computer program product having a program code stored on a machine-readable carrier for performing the inventive method, when the computer program product runs on a computer and/or a microcontroller. In other words, the invention may thus also be realized as a computer program having a program code for performing the method when the computer program runs on a computer and/or a microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for generating a magnetic field in a goal area, comprising at least two coils arranged in parallel to a goal area defined and bounded by a goal, wherein a first coil is attached in an area behind the goal and a second coil is attached closer to the goal than the first coil or attached identically to the goal, wherein the first coil and the second coil respectively comprise a coil impedance, wherein the coil impedance of the second coil is set so that a magnetic field of the second coil generated due to a magnetic field of the first coil reduces the magnetic field of the first coil at a location within the second coil by at least 20%.

2. The device according to claim 1, wherein an axis perpendicular to the goal area which passes through the center of gravity of the goal area passes at least approximately both through the center of gravity of a coil opening area of the first and the second coil bounded by coil windings.

3. The device according to claim 1, wherein the first coil comprises a coil opening area which is greater than or equal to the bounded goal area, and wherein the second coil comprises coil windings whose opening area at least approximately corresponds to the goal area.

4. The device according to claim 1, wherein the goal is bounded by two hollow side posts, one hollow crossbar and a goal line on which the goal is positioned, and wherein the second coil runs within the two hollow side posts, the hollow crossbar and within an area below the goal line, wherein there is respectively at least one cable shaft in the hollow side post and the hollow crossbar, whose cross-sectional dimension is smaller than a cross-section of the side post or the crossbar, and wherein the coil comprises a cable which runs within the cable shaft.

5. The device according to claim 1, wherein the goal is bounded by two side posts, a crossbar and a goal line, and wherein the second coil is attached to the two side posts and to the crossbar.

6. The device according to claim 1, wherein the area behind the goal comprises at least two net suspensions, and wherein the first coil is wound around an area defined by the net suspensions.

7. The device according to claim 1, wherein the device further comprises a generator for generating coil activation signals for the two coils by means of a multiplexing.

8. The device according to claim 7, wherein the generator for generating the coil activation signals generates the coil activation signals in a frequency division multiplexing.

9. The device according to claim 8, wherein the first coil is controlled with a frequency in a frequency range from 500 Hz to 5 kHz.

10. The device according to claim 7, wherein the generator for generating the coil activation signals generates the coil activation signals in a time division multiplexing.

11. The device according to claim 1, wherein the coil impedance of the second coil for a frequency of the coil activation signal is in a frequency range from 500 Hz to 5 kHz in an impedance range between 0 and 100 Ohms.

12. The device according to claim 1, wherein the second coil is operated in a short-circuit operation to act as a short-circuited secondary winding of a transformer formed from the first and the second coil.

13. The device according to claim 1, wherein the second coil may be put in a short-circuit operation or an open-circuit operation by a switch.

14. A system for determining information about a position of a movable object in a goal area, in which at least two coils are attached in parallel to a goal area bounded and defined by a goal, wherein a first coil is attached in an area behind the goal and a second coil is attached closer to the goal than the first coil or identical to the goal, wherein the first coil and the second coil respectively comprise a coil impedance, wherein the coil impedance of the second coil is set so that a field of the second coil generated due to a magnetic field of the first coil reduces the magnetic field of the first coil at a location within the second coil by at least 20%, comprising a device for providing information about a magnetic field which the movable object experiences at the position in the goal area; and a device for evaluating information about the magnetic field to obtain information about the position of the movable object in the goal area.

15. The system according to claim 14, wherein the device for providing is implemented to provide both information about a magnetic field generated by the first coil and also information about a magnetic field generated by the second coil.

16. The system according to claim 14, wherein the device for providing is located within the movable object.

17. The system according to claim 16, wherein the device for providing comprises a magnetic field sensor.

18. The system according to claim 14, wherein the device for evaluating is implemented to provide an indication from information about a time course of a magnetic field experienced by the movable object as to whether the movable object crossed the goal plane.

19. The system according to claim 18, wherein the device for evaluating is implemented to provide the goal statement by means of a derivation of the time course of the magnetic field over time.

20. The system according to claim 19, wherein the derivation of the time course of the magnetic field over time is at least approximately equal to zero at the point of time of crossing the goal line.

21. The system according to claim 14, wherein the device for evaluating is implemented to be able to provide an indication where the movable object crossed the goal plane from information of the magnetic field generated by the first coil and information of the magnetic field generated by the second coil at the location of the movable object.

22. The system according to claim 14, wherein the device for evaluating is implemented to provide an indication from a sequence of measurement values as to whether the movable object crossed the goal plane, wherein first information designates information about a magnetic field of the first coil in an open-circuit operation of the second coil, second information designates information about a reduced magnetic field of the first coil with a short-circuited second coil and third information designates information about a change between first information and second information.

23. A method for determining information about a position of a movable object in a goal area in which at least two coils are attached in parallel to a goal area defined and bounded by a goal, wherein the first coil is attached in an area behind the goal and a second coil is attached closer to the goal than the first coil or identical to the goal, wherein the first coil and the second coil respectively comprise a coil impedance, wherein the coil impedance of the second coil is set so that a field of the second coil generated due to a magnetic field of the first coil reduces the magnetic field of the first coil at a location within the second coil by at least 20%, comprising:

generating a magnetic alternating field using the first coil;
providing information about the magnetic alternating field which the movable object experiences at the position in the goal area;
evaluating the information about the magnetic alternating field to obtain information about the position of the movable object in the goal area.

24. The method according to claim 23, wherein in evaluating a sequence of measurement values is evaluated to provide an indication as to whether the movable object crossed the goal plane, wherein first information designates information about a magnetic field of the first coil in an open-circuit operation of the second coil, second information designates information about a reduced magnetic field of the first coil with a short-circuited second coil and third information designates information about a change between first information and second information.

25. A computer program embodied within a computer readable medium and having a program code for performing the method for determining information about a position of a movable object in a goal area in which at least two coils are attached in parallel to a goal area defined and bounded by a goal, wherein the first coil is attached in an area behind the goal and a second coil is attached closer to the goal than the first coil or identical to the goal, wherein the first coil and the second coil respectively comprise a coil impedance, wherein the coil impedance of the second coil is set so that a field of the second coil generated due to a magnetic field of the first coil reduces the magnetic field of the first coil at a location within the second coil by at least 20%, comprising:

generating a magnetic alternating field using the first coil;

providing information about the magnetic alternating field which the movable object experiences at the position in the goal area;

evaluating the information about the magnetic alternating field to obtain information about the position of the movable object in the goal area, when the computer program runs on a computer or a microcontroller.

\* \* \* \* \*